US011359115B2

(12) United States Patent
Prenzel et al.

(10) Patent No.: US 11,359,115 B2
(45) Date of Patent: Jun. 14, 2022

(54) ADHESIVE SYSTEM MADE OF A MULTIPLICITY OF PRESSURE-SENSITIVE ADHESIVE LAYERS

(71) Applicant: TESA SE, Norderstedt (DE)

(72) Inventors: Alexander Prenzel, Hamburg (DE); Julia Befuss, Hamburg (DE)

(73) Assignee: TESA SE, Norderstedt (DE)

( * ) Notice: Subject to any disclaimer, the term of this patent is extended or adjusted under 35 U.S.C. 154(b) by 486 days.

(21) Appl. No.: 16/347,361

(22) PCT Filed: Oct. 5, 2017

(86) PCT No.: PCT/EP2017/075273
§ 371 (c)(1),
(2) Date: May 3, 2019

(87) PCT Pub. No.: WO2018/086804
PCT Pub. Date: May 17, 2018

(65) Prior Publication Data
US 2019/0284446 A1  Sep. 19, 2019

(30) Foreign Application Priority Data
Nov. 8, 2016 (DE) ...................... 10 2016 221 843.3

(51) Int. Cl.
C09J 7/38 (2018.01)
C09J 133/02 (2006.01)
C09J 11/02 (2006.01)
C09J 133/10 (2006.01)
C09J 7/10 (2018.01)
C08K 5/00 (2006.01)

(52) U.S. Cl.
CPC ............ C09J 7/385 (2018.01); C08K 5/0025 (2013.01); C09J 7/10 (2018.01); C09J 11/02 (2013.01); C09J 133/02 (2013.01); C09J 133/10 (2013.01); *C09J 2301/208* (2020.08); *C09J 2301/302* (2020.08); *C09J 2301/414* (2020.08); *C09J 2433/00* (2013.01)

(58) Field of Classification Search
None
See application file for complete search history.

(56) References Cited

U.S. PATENT DOCUMENTS

| 8,796,389 | B2* | 8/2014 | Prenzel | .................. C08F 20/06 525/340 |
| 2005/0096432 | A1 | 5/2005 | Matsushima et al. | |
| 2012/0315476 | A1 | 12/2012 | Ogawa et al. | |
| 2015/0159051 | A1 | 6/2015 | Kohl et al. | |

FOREIGN PATENT DOCUMENTS

| DE | 10314898 A1 | 8/2004 |
| DE | 10259457 A1 | 12/2004 |
| EP | 1980601 A2 | 10/2008 |
| EP | 2298846 A1 | 3/2011 |
| KR | 1020040103945 A | 12/2004 |
| WO | 2014076206 A1 | 5/2014 |
| WO | 2014139932 A1 | 9/2014 |
| WO | 2015200007 A1 | 12/2015 |

OTHER PUBLICATIONS

German Office Action for corresponding application DE 10 2016 221 843.3 dated Jun. 1, 2017.
International Search Report for corresponding application PCT/EP2017/075273 dated Jan. 4, 2018.
KR Office Action for corresponding application KR 20197016458 dated Nov. 19, 2020.

* cited by examiner

*Primary Examiner* — Frank D Ducheneaux
(74) *Attorney, Agent, or Firm* — Norris McLaughlin PA

(57) ABSTRACT

The intention is to provide an adhesive system which is stable in storage and which when used permits precise positioning of the adhesive, and which can be crosslinked without exceeding moderate temperatures. The said system is moreover intended to provide strong adhesive bonds that attain high performance levels. This is achieved via a kit containing at least two pressure-sensitive adhesive layers A and B, where the two pressure-sensitive adhesive layers A and B mutually independently respectively comprise at least one polymer containing a multiplicity of carboxy groups; in the pressure-sensitive adhesive layer A a portion of the carboxy groups of the polymer containing these has been activated by reaction with an activator AA; and—the pressure-sensitive adhesive layer A—at least one crosslinking agent $V_A$ which can enter into a crosslinking reaction with the carboxy groups of the polymer containing these of the pressure-sensitive adhesive layers A and B, but which in the pressure-sensitive adhesive layer A is not significantly reactive; —the pressure-sensitive adhesive layer B—at least one crosslinking agent $V_B$ which can accelerate the crosslinking reaction of the carboxy groups of the polymer containing these of the pressure-sensitive adhesive layer B with the crosslinking agent $V_A$ and which can permit and accelerate the crosslinking reaction of the carboxy groups of the polymer containing these of the pressure-sensitive adhesive layer A with the crosslinking agent $V_A$ and can enter into a crosslinking reaction with the activated carboxy groups of the polymer containing these of the pressure-sensitive adhesive layer A. The invention moreover also relates to an adhesive tape which is obtainable via contact between the pressure-sensitive adhesive layers of the kit, and to a process for producing said adhesive tape.

10 Claims, No Drawings

ADHESIVE SYSTEM MADE OF A MULTIPLICITY OF PRESSURE-SENSITIVE ADHESIVE LAYERS

This is an application filed under 35 USC 371 based on PCT/EP2017/075273 filed 5 Oct. 2017, which in turn is based on DE 10 2016 221 843.3 filed 8 Nov. 2016. The present application claims the full priority benefit of these prior applications and herein incorporates by reference the full disclosures of these prior applications.

The present invention is situated within the technical field of adhesive bonding. It describes an adhesive system which is based on two or more layers of pressure-sensitive adhesive but which, by a specific mechanism of crosslinking of these layers with one another, enables bonding strengths which may go beyond the degree usual for pressure-sensitive adhesive tapes.

2-Component bonding systems have been for years in common knowledge, and described in detail in the technical literature. The functioning and use of chemically curing and two-component adhesives are set out for example in W. Brockmann, P. L. Geiss "Klebtechnik: Klebstoffe, Anwendungen and Verfahren", Wiley Verlag GmbH & Co. KGaA, 2005, 36-39. Other examples of such adhesives are disclosed in publications including WO 2014/139932 A1, US 2015/0159051 A1 and EP 2 920 221 A1. In these systems, an adhesive system consisting of two components is applied to the adherend parts, with normally two liquid components being employed. For example, in the case of chemically reacting 2-component polymerization bonding systems, one component consists of the monomer to be polymerized and an activator, and the other component consists of a radical-forming substance (also called curing agent or initiator) and the monomer to be polymerized. After mixing or at least contacting of the two components and after activation, usually by thermal means, the radical-forming substance is cleaved by the activator into two radicals, and the polymerization reaction of the monomers to be polymerized commences. The radical chain polymerization of the monomers then takes place until there is chain termination, and the adhesive cures, thereby producing a permanent bond of the adherend parts.

A disadvantage of the liquid 2-component polymerization bonding systems is that they are often messy to use, because the two components must be applied in liquid to paste-like form to the adherend parts. This is a problem in particular with extensive bonds and/or with those applications where the surfaces, for example, are inclined, rough or non-planar. Moreover, the adhesive system is generally activated only after a prolonged storage time and at elevated temperatures, which may present problems for sensitive substrates such as anodized aluminum, for example. Another disadvantage of such systems is that the storage stability of the two components may be critical. After complete curing, therefore, particularly in the event of vibrations, there may be cracks or ruptures of the bonds.

The thermal crosslinking of adhesives has been stated in the art for a long time. Such crosslinking enables effective touch-stickiness ("tack"), high shear strengths, and good processing qualities at the same time. Moreover, thermal crosslinking allows an assurance to be given of sufficient stability with respect to high temperatures, solvents and other influences. A disadvantage of thermal crosslinking, however, is the high temperature often needed to initiate the crosslinking. This may result in damage to temperature-sensitive materials.

Chemically setting adhesive tapes are likewise state of the art, examples being the 3M™ Structural Bonding Tapes #9214, #9263 and #9270. Here again, however, the curing takes place at high temperatures. Moreover, the recommendation is to store the adhesive tapes under cool conditions in order to prolong their shelf life. The use of latent reactive systems, which are likewise known in the prior art, does increase the storage stability, but in general necessitates even higher temperatures for their activation.

It is known practice, for example, to use acrylic acid for chemical crosslinking, particularly in (pressure-sensitive) polyacrylate adhesives. To allow the reaction of a carboxylic acid with a nucleophilic crosslinker, particularly an amine or an alcohol, a reaction which normally starts only at decidedly high temperatures of around 200° C., peptide synthesis, for example, uses coupling reagents. These agents allow reaction in some cases even at room temperature. The process here is one of activation of the carboxylic acid present, by means of the coupling reagent. Subsequently, the amine can be attached to the activated carboxylic acid. The use and also the multiplicity of coupling reagents are described in E. Valeur, M. Bradley "Amide bond formation: beyond the myth of coupling reagents" *The Royal Society of Chemistry* 2009, 38, 606-631.

It is an object of the present invention to provide an adhesive bonding system which is storage-stable, which in application permits precise positioning of the adhesive, and allows the adhesive to be crosslinked even at moderate temperatures. The attention, moreover, is to obtain very strongly performing, robust bonds with this system.

It has been found that this object is achieved with an adhesive bonding system composed of at least two pressure-sensitive adhesive layers, which can be crosslinked with one another via a specific mechanism. A first and general subject of the invention is a kit which comprises at least two pressure-sensitive adhesive layers A and B, where the two pressure-sensitive adhesive layers A and B independently of one another each comprise at least one polymer containing two or more carboxyl groups;

in the pressure-sensitive adhesive layer A, some of the carboxyl groups of the polymer comprising them are activated as a result of reaction with an activator $A_A$; and the pressure-sensitive adhesive layer A comprises at least one crosslinker $V_A$ which is suitable for the crosslinking reaction with the carboxyl groups of the polymers comprising them in the pressure-sensitive adhesive layers A and B, but is not substantially reactive in the pressure-sensitive adhesive layer A;

the pressure-sensitive adhesive layer B comprises at least one crosslinker $V_B$ which is suitable for accelerating the crosslinking reaction of the carboxyl groups of the polymer comprising them in the pressure-sensitive adhesive layer B with the crosslinker $V_A$, for enabling and accelerating the crosslinking reaction of the carboxyl groups of the polymer comprising them in the pressure-sensitive adhesive layer A with the crosslinker $V_A$, and for the crosslinking reaction with the activated carboxyl groups of the polymer comprising them in the pressure-sensitive adhesive layer A.

Subject to the proviso of the contacting of the pressure-sensitive adhesive layers A and B, the crosslinker $V_A$ reacts with the carboxyl groups of the polymers comprising them in the pressure-sensitive adhesive layers A and B in a crosslinking reaction, the crosslinker $V_B$ exerts an accelerating effect on the crosslinking reaction of the carboxyl groups of the polymer comprising them in the pressure-sensitive adhesive layer B with the crosslinker $V_A$, the crosslinker $V_B$ enables and accelerates the crosslinking reaction of the carboxyl groups of the polymer comprising them in the pressure-sensitive adhesive layer A with the crosslinker $V_A$, and the crosslinker $V_B$ reacts with the activated carboxyl groups of the polymer comprising them in the pressure-sensitive adhesive layer A in a crosslinking reaction. All of this takes place at room temperature, though may be further accelerated if necessary by the supplying of heat.

The multi-component adhesive bonding system of the invention is easy to operate; the layers already have pressure-sensitive adhesiveness. Hence it is possible to prevent slipping during application to the substrate to be bonded or to a layer which has already been bonded. This permits more precise bonding than that obtained, for example, using liquid two-component adhesives.

A "kit" in accordance with the invention—and in line with the general understanding—refers to a pack in which at least two parts are present separately from one another. "Separately from one another" means that the parts within the pack cannot come directly into contact with one another.

The term "pressure-sensitive adhesive" herein, in agreement with the general understanding, describes materials which either are inherently tacky or which through the addition of tackifying resins ("tackifiers") are formulated such that they are tacky. In accordance with the present invention, pressure-sensitive adhesives and/or pressure-sensitive adhesive bonding products encompass materials and/or finished products which according to one of the known methods for determining pressure-sensitive adhesives, can be classified as such, and encompass, in particular, those materials and/or finished products which can be classified as pressure-sensitive adhesives by one or more of the methods below.

According to the "*Glossary of Terms Used in the Pressure Sensitive Tape Industry*", published in August 1985 by the Pressure Sensitive Tape Council, a pressure-sensitive adhesive is characterized, and can accordingly be defined as such, by virtue of the fact that it exhibits an aggressive and permanent tack at room temperature and adheres firmly to a multiplicity of dissimilar surfaces upon mere contact without further application of pressure greater than on securing with a finger or with a hand.

In particular, pressure-sensitive adhesives are defined in accordance with the present invention by being classifiable as such in accordance with at least one of the two methods set out below.

According to a first method, pressure-sensitive adhesives—PSAs—are defined by the Dahlquist criteria, which are described inter alia in D. Satas, *Handbook of Pressure Sensitive Adhesives*, $2^{nd}$ edition, page 172, 1989. According to one of these criteria, a material is defined as a good PSA if at service temperature it has a modulus of elasticity of less than $1 \cdot 10^6$ Pa.

In accordance with a second method, a further criterion for determining PSAs is that their storage modulus at room temperature (25° C.) lies within the following ranges as measured by frequency sweep: within a range from $2 \cdot 10^5$ to $4 \cdot 10^5$ Pa at a frequency of 0.1 rad/sec (0.017 Hz) and within a modulus range of $2 \cdot 10^6$ to $8 \cdot 10^6$ Pa at a frequency of 100 rad/sec (17 Hz) (represented, for example, in table 8-16 in D. Satas, *Handbook of Pressure Sensitive Adhesive Technology*, $2^{nd}$ edition, page 173, 1989).

The at least two PSA layers in the kit of the invention— that is, the pressure-sensitive adhesive layers A and B—permit a crosslinking reaction initiated just by the mere contacting of the two layers. This reaction results in an adhesive layer which in terms of its robustness may also correspond to a PSA or be crosslinked to such an extent that it has the qualities of a (semi-)structural adhesive or of a two-component adhesive based on liquid components. The term "structural adhesive" is used in general for heavy-duty adhesives which ensure a possible constructional design permanently with high strength and/or stiffness in conjunction with largely uniform and favorable distribution of stress.

Polymers containing carboxyl groups in the PSA layers A and B include in principle all polymers known to the skilled person that are suitable for producing PSAs, provided that these polymers, indeed, have at least two carboxyl groups (—COOH).

The polymer containing two or more carboxyl groups in the PSA layer A is preferably a poly(meth)acrylate. The polymer containing two or more carboxyl groups in the PSA layer B is likewise preferably a poly(meth)acrylate. With particular preference, both the polymer containing two or more carboxyl groups in the PSA layer A and the polymer containing two or more carboxyl groups in the PSA layer B are each a poly(meth)acrylate.

A "poly(meth)acrylate" refers to a polymer whose monomer basis consists to an extent of at least 70 wt % of acrylic acid, methacrylic acid, acrylic esters and/or methacrylic esters, with acrylic esters and/or methacrylic esters being included at not less than 50 wt %, based in each case on the overall monomer composition of the polymer in question. Poly(meth)acrylates are accessible generally through radical polymerization of acrylic and/or methacrylic monomers and also, optionally, further, copolymerizable monomers. In accordance with the invention, the term "poly(meth)acrylate" embraces not only polymers based on acrylic acid and derivatives thereof but also those based on acrylic acid and methacrylic acid and derivatives thereof, and those based on methacrylic acid and derivatives thereof.

Where one of the polymers containing two or more carboxyl groups in the PSA layers A and B is a poly(meth)acrylate, this poly(meth)acrylate originates preferably from a monomer composition which consists of (a1) 70 to 100 wt % of compounds of formula (I)

in which $R^1$ is H and/or $CH_3$ and $R^2$ is H and/or alkyl chains having 1 to 30 carbons, with the fraction of compounds of the formula (I) with $R^2$=H being up to 20 wt %, more preferably up to 15 wt %, based in each case on the overall monomer composition of the poly(meth)acrylate;

(a2) 0 to 30 wt % of further olefinically unsaturated monomers having functional groups; and (a3) 0 to 5 wt % of further acrylates and/or methacrylates and/or olefinically unsaturated monomers which are copolymerizable with the component (a) and have at least one functional group suitable for forming a covalent bond with a crosslinker $V_A$ or $V_B$ that is available to it.

The monomers (a1) are more preferably acrylic acid, methacrylic acid and/or acrylic and/or methacrylic esters having alkyl groups containing 1 to 14 carbons. More particularly the monomers (a1) are selected from the group consisting of acrylic acid, methacrylic acid, methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate and the branched isomers thereof, e.g. 2-ethylhexyl acrylate, and also cyclohexyl methacrylate, isobornyl acrylate and isobornyl methacrylate.

The monomers (a2) are more preferably selected from the group consisting of maleic anhydride, itaconic anhydride, glycidyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate and tetrahydrofurfuryl acrylate, and also aromatic vinyl compounds whose aromatic nuclei consist of C4 to C18 units and may also include heteroatoms, e.g. styrene, N-vinylphthalimide, methylstyrene and 3,4-dimethoxystyrene.

The monomers (a3) are preferably selected from the group consisting of itaconic acid, acrylamide and cyanoethyl methacrylate, cyanoethyl acrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinylacetic acid, β-acryloyloxypropionic acid, trichloroacrylic acid, fumaric acid, crotonic acid, aconitic acid, dimethylacrylic acid and 4-vinylbenzoic acid, this enumeration not being conclusive.

For the polymerization the monomers are preferably selected such that the resulting polymers can be used as thermally crosslinkable PSAs, more particularly such that the resulting polymers possess properties of pressure-sensitive adhesive bonding in accordance with the "Handbook of Pressure Sensitive Adhesive Technology" by Donatas Satas (van Nostrand, New York 1989).

The poly(meth)acrylates are preferably prepared by implementation of conventional radical polymerizations or controlled radical polymerizations. For the polymerizations proceeding by a radical mechanism, initiator systems employed are preferably those additionally containing further radical initiators for the polymerization, especially radical-forming azo or peroxo initiators which decompose thermally. Suitable in principle, however, are all initiators customary for acrylates and/or methacrylates. The production of C-centered radicals is described in Houben-Weyl, *Methoden der Organischen Chemie*, vol. E 19a, pp. 60-147. In the context of the invention, these methods are preferably applied analogously.

The polymerization may be carried out in bulk, in one or more organic solvents, in water, or in mixtures of organic solvents and water. The aim here is to minimize the amount of solvent used. Suitable organic solvents are pure alkanes (e.g. hexane, heptane, octane, isooctane), aromatic hydrocarbons (e.g. benzene, toluene, xylene), esters (e.g. ethyl acetate, propyl, butyl or hexyl acetate), halogenated hydrocarbons (e.g. chlorobenzene), alkanols (e.g. methanol, ethanol, ethylene glycol, ethylene glycol monomethyl ether), ketones (e.g. acetone, butanone) and ethers (e.g. diethyl ether, dibutyl ether) and mixtures thereof. The aqueous polymerization reactions may be treated with a water-miscible or hydrophilic cosolvent in order to ensure that, during monomer conversion, the reaction mixture is present in the form of a homogeneous phase. The cosolvents in the context of the present invention are preferably selected from the group consisting of aliphatic alcohols and glycols, ethers, glycol ethers, pyrrolidines, N-alkylpyrrolidinones, N-alkylpyrrolidones, polyethylene glycols, polypropylene glycols, amides, carboxylic acids and salts thereof, esters, organosulfides, sulfoxides, sulfones, alcohol derivatives, hydroxyether derivates, amino alcohols, ketones, and also derivatives and mixtures thereof.

The polymerization time, depending on conversion and temperature, is between 4 and 72 hours. The higher the reaction temperature can be selected, in other words the greater the thermal stability of the reaction mixture, the shorter the reaction time that can be selected.

Regarding the initiation of the polymerization, the introduction of heat is essential for the thermally decomposing initiators. For the thermally decomposing initiators, the polymerization can be initiated by heating to 50 to 160° C., depending on initiator type.

Further, it is advantageous to use polymerization-regulating chain transfer agents, in order thereby to implement polymerization in a controlled way and to be able to exert an influence on the molar mass distribution.

The PSA layers A and B each comprise at least one polymer containing carboxyl groups. Some of the carboxyl groups of the polymer in the layer A are activated for a crosslinking reaction even at relatively low temperatures, by means of the at least one activator $A_A$ (alternatively also referred to as coupling reagent). The principle being employed, then, is similar to that associated with peptide synthesis. Accordingly, crosslinking is possible even at room temperature after the PSA layers A and B have been brought together. This is advantageous in particular in the case of temperature-sensitive substrates.

Alternatively or additionally to the poly(meth)acrylates, the PSA layers A and B independently of one another may comprise further polymers, in each case containing two or more carboxyl groups. With preference these polymers are selected from the group consisting of acid-modified or maleic anhydride-modified, saturated and unsaturated, synthetic rubbers and styrenic block copolymers, part-hydrolyzed polyvinyl acetate, part-hydrolyzed EVA systems, polyurethanes, polyesters and silicones.

The PSA layers A and B independently of one another preferably each comprise at least one tackifying resin. The tackifying resin is more preferably selected from the group consisting of pinene resins, indene resins and rosins, their disproportionated, hydrogenated, polymerized and/or esterified derivatives and salts, aliphatic and aromatic hydrocarbon resins, terpene resins, terpene-phenolic resins and C5, C9 and other hydrocarbon resins, and mixtures of these tackifying resins. Any desired combinations of these and further resins may be used in order to bring the properties of the PSA layers into line with requirements. Generally speaking, it is possible to use all resins that are compatible with (soluble in) the corresponding PSA. More particularly the tackifying resin is selected from the group consisting of aliphatic, aromatic and alkylaromatic hydrocarbon resins, hydrocarbon resins based on pure monomers, hydrogenated hydrocarbon resins, functional hydrocarbon resins, and natural resins. Reference may be made expressly to the depiction of the state of knowledge in the "Handbook of Pressure Sensitive Adhesive Technology" by Donatas Satas (van Nostrand, 1989).

A further subject of the invention is an adhesive tape which is obtainable by contacting at least two pressure-sensitive adhesive layers A and B, where the two pressure-sensitive adhesive layers A and B independently of one another each comprise at least one polymer containing two or more carboxyl groups;

in the pressure-sensitive adhesive layer A, some of the carboxyl groups of the polymer comprising them are activated as a result of reaction with an activator $A_A$; and the pressure-sensitive adhesive layer A comprises at least one crosslinker $V_A$ which is suitable for the crosslinking reaction with the carboxyl groups of the polymers comprising them in the pressure-sensitive adhesive layers A and B, but is not substantially reactive in the pressure-sensitive adhesive layer A;

the pressure-sensitive adhesive layer B comprises at least one crosslinker $V_B$ which is suitable for accelerating the crosslinking reaction of the carboxyl groups of the polymer comprising them in the pressure-sensitive adhesive layer B with the crosslinker $V_A$, for enabling and accelerating the crosslinking reaction of the carboxyl groups of the polymer comprising them in the pressure-sensitive adhesive layer A with the crosslinker $V_A$, and for the crosslinking reaction with the activated carboxyl groups of the polymer comprising them in the pressure-sensitive adhesive layer A.

The PSA layers A and B which are brought into contact with one another to give the adhesive tape of the invention thus correspond to the PSA layers of the kit of the invention. The kit in accordance with the invention is intended for storage of the two PSA layers A and B separately from one another, so that they are brought together, i.e. contacted with one another, only for the purpose of their application, whereupon a crosslinking begins within the layers A and B and also between the layers A and B, and hence the adhesive tape of the invention is provided. All embodiments described accordingly in connection with the kit of the invention are therefore also valid correspondingly for the adhesive tape of the invention. Similarly, all observations below relating to further constituents of the PSA layers A and B refer both to the kit of the invention and to the adhesive tape of the invention.

"Crosslinking" in accordance with the invention refers to a chemical reaction between two or more polymer molecules wherein a three-dimensional network is formed between these macromolecules. The onset of crosslinking is manifested, for example, in an increase in the elastic component, which is obtained as a measurement value in the test known as the microshear test (see experimental section) and, consequently, in a shortening of the shear travel. Complete crosslinking—that is, crosslinking which has taken place up to the point of attaining the level of crosslinking possible theoretically under the prevailing conditions—is manifested, accordingly, in a plateauing of the values for the elastic component and/or the shear travel.

"Thermal crosslinking" means a crosslinking initiated by supply of thermal energy. Depending on the nature of the activation required, the thermal energy present at room temperature may itself be sufficient for thermal crosslinking. In general, however, temperature increase is performed by active heating in order to start the crosslinking, or the thermal energy is supplied in another way, such as by mechanical influence, e.g. ultrasound, or by exothermic reaction processes in the reaction system. The influence of actinic (high-energy) radiation such as ultraviolet rays, electron beams or radioactive rays is not necessary for the thermal crosslinking. A crosslinking reaction initiated by actinic radiation may nevertheless be utilized in order to increase the efficiency of the thermal crosslinking.

In order to maximize the degree of crosslinking within the adhesive tape of the invention, a crosslinker $V_A$ is added to the PSA layer A. The crosslinker $V_A$ is suitable in principle for the crosslinking reaction with the carboxyl groups of the polymers containing carboxyl groups in the layers A and B, but within the layer A is not substantially reactive, including not toward activated carboxyl groups in this layer. "Not substantially reactive" means that the reaction in question takes place either not at all or not to a technically meaningful extent, and/or that the period of time needed in order to achieve a technically meaningful reaction success is not reasonable technically. The crosslinker $V_A$ preferably is suitable for the crosslinking reaction with the carboxyl groups of the polymers containing carboxyl groups in the layers A and B, but is not reactive in the layer A.

In accordance with the invention, the crosslinker $V_A$ is able to react, and also does actually react, with non-activated carboxyl groups of the polymer in the layer A in the presence of the crosslinker $V_B$. Accordingly, it is only the presence of the crosslinker $V_B$ in the PSA layer A that allows the carboxyl groups of the polymer in the layer A to react with the crosslinker $V_A$. In accordance with the invention, therefore, after the contacting of the layers A and B, there is mutual migration of constituents from one layer into the other layer in each case. After the layers A and B have been contacted, therefore, they must not be kept strictly apart from one another. If, therefore, the crosslinker $V_A$ is said to be not (substantially) reactive in the PSA layer A, this applies—according to the particular subject of the invention—only to the status before the contacting of the layers A and B. This status is realized both in the kit of the invention and also in the context of the adhesive tape or method of the invention, the description of which is geared to the layers to be brought into contact with one another. After the contacting, the layers A and B no longer require strict separation, and in case of doubt no longer require any separation at all, from one another, because of the interpenetration that occurs.

The crosslinker $V_A$ is more particularly a thermal crosslinker. Preferably it is storage-stable and reacts only at relatively high temperatures, more preferably at temperatures above the processing temperatures for producing the adhesive tape of the invention, more particularly at temperatures of >150° C. The crosslinker $V_A$ is preferably a polyfunctional epoxide, meaning that it comprises at least two epoxide functions per molecule. Suitable crosslinkers $V_A$ include both aromatic and aliphatic compounds, and there may also be two or more crosslinkers $V_A$ in the PSA layer A. The molar ratio of the epoxide functions of the preferred crosslinker or crosslinkers $V_A$, relative to the carboxyl groups of the polymers comprising them in the PSA layers A and B, is preferably from 0.1 to 20 mol %, more particularly from 1 to 10 mol %, very preferably from 3 to 5 mol %. The molar ratio in this context is calculated according to the following formula (II), $$\text{molar ratio [mol-\%]} = \frac{n_{epoxide} N_{func\cdot groups}}{n_{carboxylic\ acids}} \cdot 100 = \frac{\left(\frac{m_{epoxide}}{M_{epoxide}}\right) \cdot N_{func\cdot groups}}{\frac{m_{carboxylic\ acid\ monomer}}{\sum_i m_{monomers\ i}} \cdot \frac{M_{n\cdot polymer}}{m_{carboxylic\ acid\ monomer}}} \cdot 100 \qquad (II)$$

in which N corresponds to the number of functional groups in the epoxide molecule, i stands for the entirety of the monomers of the polymers containing carboxyl groups, and n, m and M have the customary meaning.

With particular preference the crosslinker $V_A$ is selected from the group consisting of oligomers of epichlorohydrin;

epoxy ethers of polyhydric alcohols, especially ethylene, propylene and butylene glycols, polyglycols, thiodiglycols, glycerol, pentaerythritol, sorbitol, polyvinyl alcohol and polyallyl alcohol;

epoxy ethers of polyhydric phenols, especially resorcinol, hydroquinone, bis(4-hydroxyphenyl)methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxy-phenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichloro-phenyl)propane, 2,2-bis(4-hydroxy-3,5-dichlorophenyl)propane, bis(4-hydroxy-phenyl)phenylmethane, bis(4-hydroxyphenyl)phenylmethane, bis(4-hydroxyphenyl)di-phenylmethane, bis(4-hydroxyphenyl)-4'-methylphenylmethane, 1,1-bis(4-hydroxy-phenyl)-2,2,2-trichloroethane, bis(4-hydroxyphenyl)-(4-chlorophenyl)methane, 1,1-bis(4-hydroxyphenyl)cyclohexane, bis(4-hydroxyphenyl)-cyclohexylmethane, 4,4'-dihydroxybiphenyl, 2,2'-dihydroxybiphenyl and 4,4'-dihydroxydiphenyl sulfone, and also their hydroxyethyl ethers;

phenol-formaldehyde condensation products such as phenol-alcohols and phenol-aldehyde resins; S- and N-containing epoxides, for example N,N-diglycidylaniline and N,N'-dimethyldiglycidyl-4,4-diaminodiphenylmethane; epoxides prepared by customary methods from polyunsaturated carboxylic acids or monounsaturated carboxylic esters of unsaturated alcohols; glycidyl esters; and polyglycidyl esters, which may be obtained by polymerization or copolymerization of glycidyl esters of unsaturated acids, or are obtainable from other acidic compounds such as cyanuric acid, diglycidyl sulfide, cyclic trimethylene trisulfone and/or derivatives thereof.

Especially preferred ethers are selected from the group consisting of 1,4-butanediol diglycidyl ether, polyglycerol-3 glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether, polypropylene glycol diglycidyl ether, trimethylolpropane triglycidyl ether, bisphenol A diglycidyl ether and bisphenol F diglycidyl ether.

Additionally to the epoxies, it is also possible for metal chelates and polyfunctional isocyanates to be present as crosslinkers in the PSA layer A. UV-activatable crosslinkers can be utilized as well.

In accordance with the invention, two or more carboxyl groups of the polymer containing them in the layer A have been activated as a result of reaction with an activator $A_A$. The activator is not intended as a crosslinking component. Rather it is thought that it activates the carboxyl groups and hence lowers the activation energy of the crosslinking reaction. "Activated" in relation to the activator $A_A$ means in particular that the carboxyl groups react with the activator $A_A$ with loss of the proton, in an esterification.

It has been found that the use of the activator $A_A$ in the PSA layer A leads to a lowering of the reaction temperature of the crosslinking within and/or between the layers A and B. The activated carboxyl groups of the layer A here react exclusively with the crosslinker $V_B$ present initially in the layer B. Only after the contacting of the layers A and B, as provided for producing the adhesive tape of the invention, therefore, does the crosslinking reaction take place between the activated carboxylic acid groups of the polymer or corresponding polymers of the layer A and the crosslinker $V_B$. The molar ratio of the activator $A_A$ to the carboxyl groups available in the polymer or polymers of the layer A is preferably from 0.3 to 85 mol %, more preferably from 1 to 45 mol %, more particularly from 2 to 10 mol %.

The activator $A_A$ is preferably selected from the group of the peptide coupling reagents. More preferably the activator $A_A$ is selected from the group consisting of carbodiimides, benzotriazolyl-N-oxyphosphonium compounds, azabenzotriazolyl-N-oxyphosphonium compounds, O-(benzotriazol-1-yl)uronium compounds, O-(7-azabenzotriazol-1-yl)uronium compounds, N-uronium-substituted cyclic imides, thiophosphinic chlorides, thiophosphinic azides, triazyl esters and α-halopyridinium salts.

Particularly preferred activators $A_A$ are compounds based on carbodiimides of the formula (III)

in which the groups $R_1$ and $R_2$ may be identical or different and are substituted or unsubstituted alkyl radicals, more particularly unsubstituted alkyl radicals having 2 to 6 carbons. Particularly preferred compounds of the formula (III) are N,N-dicyclohexylcarbodiimide (DCC; $R_1=R_2=$cyclohexyl group), N,N'-di-isopropylcarbodiimide (DIC; $R_1=R_2=$propyl group) and 1-ethyl-3-(3-dimethylaminopropyl)carbodiimide (EDC; $R_1=$ethyl group and $R_2=$dimethylpropylamine group);

phosphonium salts selected from benzotriazolyl-N-oxytrisdimethylaminophosphonium hexafluoro-phosphate (BOP; A=CH, R=dimethylamino group), benzotriazol-1-yloxytri(pyrrolidino)phosphonium hexafluorophosphate (PyBOP; A=CH, R=pyrrolidino group), and also 7-azabenzotriazol-1-yl-oxytripyrrolidinophosphonium hexafluorophosphate (PyAOP; A=nitrogen atom, R=pyrrolidine group) and further compounds based on the above having different radical groups on the phosphorus atom;

triazole-based reagents according to the formula (V)

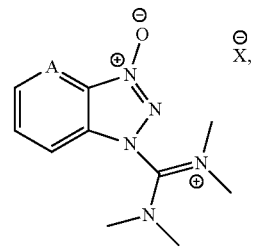

more particularly O-(benzotriazol-1-yl)-1,1,3,3-tetramethyluronium hexafluorophosphate (HBTU; A=CH, X=hexafluorophosphate), O-(benzotriazol-1-yl)-1,1,3,3-tetramethyluronium tetrafluoroborate (TBTU; A=CH, X=tetrafluoroborate), O-(7-azabenzotriazol-1-yl)-1,1,3,3-tetramethyluronium hexafluorophosphate (HATU; A=nitrogen atom, X=hexafluorophosphate), and also O-(7-azabenzotriazol-1-yl)-1,1,3,3-tetramethyluronium tetrafluoroborate (TATU; A=nitrogen atom, X=tetrafluoroborate);

reagents based on uronium corresponding to the formula (VI):

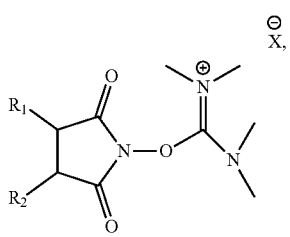

more particularly 2-succinimido-1,1,3,3-tetramethyluronium tetrafluoroborate (TSTU; X=tetrafluoroborate, $R_1=R_2=$hydrogen atom) and 2-(5-norbornene-2,3-dicarboximido)-1,1,3,3-tetramethyluronium tetrafluoroborate (TNTU; X=tetrafluoroborate, $R_1+R_2$ together make cyclopentene);

thioyls corresponding to the formula (VII):

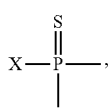

more particularly dimethylphosphinothioyl azide (MPTA; X=azide group) and dimethylphosphinothioyl chloride (MPT-Cl; X=Cl);

and also N,N,N',N'-tetramethylchloroformamidinium hexafluorophosphate (TCFH), 3-(diethoxyphosphoryloxy)-1,2,3-benzotriazin-4(3H)-one (DEPBT) and carbonyldiimidazole (CDI).

With very particular preference the activator $A_A$ is benzotriazol-1-yloxytri(pyrrolidino)-phosphonium hexafluorophosphate (PyBOP).

The PSA layer B in accordance with the invention comprises at least one crosslinker $V_B$, which, for the reaction of the carboxyl groups of the polymer containing them in the PSA layer B with the crosslinker $V_A$, may have an accelerating effect and/or also has an accelerating effect when the reactants are contacted, and which additionally enables and accelerates the crosslinking reaction of the carboxyl groups of the polymer containing them in the PSA layer A with the crosslinker $V_A$—of course again on contacting of the reactants—and is suitable itself for the crosslinking reaction with the carboxyl groups of the polymer containing them in the PSA layer A. The crosslinker $V_B$, accordingly, is characterized by a triple function. Firstly it acts as a crosslinker in the PSA layer A, by first penetrating that layer and then reacting with the activated carboxyl groups contained therein; secondly it acts as an accelerator for the crosslinking reaction proceeding in the PSA layer B between the carboxyl groups and the crosslinker $V_A$, and also as an activator and accelerator of the crosslinking reaction of the carboxyl groups of the polymer containing them in the PSA layer A with the crosslinker $V_A$.

The crosslinker $V_B$ is mobile and is able, preferably by diffusion, to enter the layer A after the layers A and B have been brought together. It is assumed that it acts there as a nucleophile and reacts with the activated carboxylic acid to form a covalent bond. It is further assumed that in the layer B it acts as a base and therefore accelerates the crosslinking reaction of the crosslinker $V_A$ with the polymer-bonded carboxyl groups in this layer. The latter presupposes in turn that the crosslinker $V_A$ as well, again preferably by diffusion, after the layers A and B have been brought together, enters initially into the layer B. The crosslinker $V_B$ is therefore not consumed in the crosslinking reaction of the layer B and is present thereafter in the original state.

Suitable crosslinkers $V_B$ are preferably at least difunctional and may contain not only identical but also different functional groups. The crosslinker $V_B$ is preferably selected from the group consisting of polyester polyols, polyfunctional amines and polyfunctional alcohols. With particular preference the crosslinker $V_B$ is selected from the group consisting of primary, polyfunctional amines and polyfunctional alcohols. The molar ratio of the crosslinker $V_B$ to the activated carboxyl groups available in the polymer or polymers of the layer A is preferably from 0.3 to 85 mol %, more preferably from 1 to 45 mol %, more particularly from 2 to 8 mol %.

With very particular preference the crosslinker $V_B$ is selected from the group consisting of ethylene glycol, polyethylene glycol, 2,3-dihydroxy-2-cyclopentenone, 1,3-propanediol, 4-cyclopentene-1,3-diol, benzene-1,2-diol, cyclohexane-1,2-diol, isophoronediamine, N,N,N,N-tetramethylmethanediamine, 1,2-ethanediamine, N,N,N,N,N,N-hexamethyl-methanetriamine, hexamethylenetetramine, N,N'-dimethyl-1,3-propanediamine, N,N,2,2-tetramethyl-1,3-propanediamine and N,N',2-trimethyl-1,3-propanediamine. More particularly, the crosslinker $V_B$ is selected from the group consisting of isophoronediamine, N,N,N,N-tetramethylmethanediamine, 1,2-ethanediamine, N,N,N,N,N,N-hexamethylmethanetriamine, hexamethylenetetramine, N,N'-dimethyl-1,3-propanediamine, N,N,2,2-tetramethyl-1,3-propanediamine and N,N',2-trimethyl-1,3-propanediamine.

The adhesive tape of the invention is obtainable by contacting at least the PSA layers A and B. The adhesive tape of the invention is preferably obtainable by contacting two or more layers A and/or B, more particularly in such a way that a construction of the form A-B-A or an alternating structure of the form A-B-A-B-A-B-A-... is produced, with the outer layers being formed in each case of a PSA layer A. In constructions of these kinds, therefore, one layer B is surrounded in each case by two layers A. The lamination of two or more PSA layers A and B enables, advantageously, the production of relatively high layer thicknesses.

The PSA layers A and B have preferably independently of one another in each case a layer thickness of 5 to 1000 µm, more preferably of 20 to 500 µm, more particularly of 50 to 150 µm. Likewise preferably the layer thickness of the PSA layer A is higher than the layer thickness of the PSA layer B. The ratio of the layer thickness of the PSA layer A to the layer thickness of the PSA layer B here is preferably up to 3:1, more preferably up to 2:1 and more particularly up to 3:2.

Before being mutually contacted, the PSA layers A and B are preferably pretreated physically or chemically on at least one side, more particularly through the application of a chemical adhesion promoter layer (primer layer) or by means of corona, flame or plasma treatment.

The contacting of the PSA layers may take place from dispersion or solution or in hotmelt mode. In the case of coating from dispersion or solution, the dispersion media or solvent is evaporated off preferably at room temperature. Advantageously, therefore, premature or increased-onset crosslinking is prevented.

For the purpose of storage, the PSA layers A and B and the adhesive tape of the invention are preferably lined with a release liner or release paper.

The crosslinking reaction can be accelerated by the action of heat on the layer assembly obtained by the contacting of the PSA layers A and B. Temperatures at or above 40° C. in general already have an accelerating effect. Particularly rapid crosslinking reactions are enabled at temperatures at and above 100° C.

For improved lamination of the individual layers A and B one atop another and also to the substrates to be bonded, it is possible for dispensers or laminators to be utilized.

The adhesive tape of the invention is outstandingly suitable for use of automated and rapid processing operations. Both permanent and temporary bonds of different materials and components are possible in this context, examples being emblems, bumpers and trim strips. Use in the construction sector as well is conceivable.

A last subject of the invention is a method for producing an adhesive tape, which comprises the contacting of at least two pressure-sensitive adhesive layers A and B, where the two pressure-sensitive adhesive layers A and B independently of one another each comprise at least one polymer containing two or more carboxyl groups;

in the pressure-sensitive adhesive layer A, some of the carboxyl groups of the polymer comprising them are activated as a result of reaction with an activator $A_A$; and the pressure-sensitive adhesive layer A comprises
at least one crosslinker $V_A$ which is suitable for the crosslinking reaction with the carboxyl groups of the polymers comprising them in the pressure-sensitive adhesive layers A and B, but is not substantially reactive in the pressure-sensitive adhesive layer A;

the pressure-sensitive adhesive layer B comprises
at least one crosslinker $V_B$ which is suitable
for accelerating the crosslinking reaction of the carboxyl groups of the polymer comprising them in the pressure-sensitive adhesive layer B with the crosslinker $V_A$,
for enabling and accelerating the crosslinking reaction of the carboxyl groups of the polymer comprising them in the pressure-sensitive adhesive layer A with the crosslinker $V_A$, and
for the crosslinking reaction with the activated carboxyl groups of the polymer comprising them in the pressure-sensitive adhesive layer A.

EXAMPLES

Unless indicated otherwise or evident individually, the sample preparation and measurement procedures take place under standard conditions (25° C., 101 325 Pa).

I. Static Glass Transition Temperature Tg

The static glass transition temperature is determined via dynamic scanning calorimetry according to DIN 53765. The figures for the glass transition temperature Tg are based on the glass transformation temperature Tg according to DIN 53765:1994-03, unless otherwise indicated in a specific case.

II. Molecular Weights The average molecular weights (weight average Mw and number average Mn) and the polydispersity D were determined by gel permeation chromatography (GPC). The eluent used was THF with 0.1 vol % of trifluoroacetic acid. Measurement took place at 25° C. The pre-column used was PSS-SDV, 5 μm, $10^3$ Å ($10^{-7}$ m), ID 8.0 mm×50 mm. Separation took place using the columns PSS-SDV, 5 μm, $10^3$ Å ($10^{-7}$ m), $10^5$ Å ($10^{-5}$ m) and $10^6$ Å ($10^{-4}$ m) each with ID 8.0 mm×300 mm. The sample concentration was 4 g/L, the flow rate 1.0 ml per minute. Measurement was made against PMMA standards.

III. Solids Content:

The solids content is a measure of the fraction of unevaporable constituents in a polymer solution. It is determined gravimetrically by weighing the solution, then evaporating off the evaporable fractions in a drying cabinet at 120° C. for 2 hours and reweighing the residue.

IV. K Value (According to Fikentscher):

The K value is a measure of the average molecular size of high-polymer compounds. For the purpose of the measurement, one percent strength (1 g/100 ml) toluenic polymer solutions were prepared and their kinematic viscosities were determined by means of a Vogel-Ossag viscometer. Following standardization to the viscosity of the toluene, the relative viscosity is obtained, from which the K value can be computed by the method of Fikentscher (Polymer 8/1967, 381 ff.).

V. Shear Strength: Static Shear Test HP

A strip of the adhesive tape, 13 mm wide and 30 mm long, was applied to a smooth steel surface which had been cleaned three times with acetone and once with isopropanol. The bond area was 20 mm·13 mm (length·width), and so the adhesive tape overhung the test plate at the edge by 10 mm. The adhesive tape was subsequently pressed onto the steel support four times with an applied pressure corresponding to a weight of 2 kg. This sample was suspended vertically so that the protruding end of the adhesive tape pointed downward.

At room temperature a weight of 1 kg was affixed to the protruding end of the adhesive tape. The measurement was conducted under standard conditions (23° C.+/−1° C., 55%+/−5% atmospheric humidity) and at 70° C. in a heating cabinet, the sample for this measurement having been loaded with a weight of 0.5 kg.

The holding powers measured (times taken for the adhesive tape to detach completely from the substrate; measurement terminated at 10 000 minutes) are reported in minutes and correspond to the average from three measurements.

VI. Peel Strength (Peel Adhesion) PA

A strip of the adhesive tape under investigation is bonded in a defined width (standard: 20 mm) to a sanded steel plate (stainless steel 302 according to ASTM A 666; 50 mm×125 mm×1.1 mm; bright annealed surface; surface roughness Ra=50±25 nm average arithmetic deviation from the baseline) by being rolled down ten times with a 4 kg steel roller. Double-sided adhesive tapes are reinforced on the reverse with an unplasticized PVC film 36 μm thick. Identical samples are produced and are alternatively provided for immediate measurement, stored for 7 days and then measured, or stored for 14 days and then measured.

The prepared plate is clamped (fixed) into the testing apparatus, and the adhesive strip is peeled from the plate via its free end in a tensile testing machine at a peel angle of 180° and at a speed of 300 mm/min in the longitudinal direction of the adhesive tape. The force necessary for performing this operation is recorded. The results of the measurements are reported in N/cm (force standardized to the particular distance of bond parted) and are averaged over three measurements. All of the measurements are carried out in a conditioned chamber at 23° C. and 50% relative humidity.

VII. Microshear Test

This test serves for the accelerated testing of the shear strength of adhesive tapes under temperature load.

Sample Preparation for Microshear Test:

An adhesive tape (length 50 mm, width 10 mm) cut from the respective sample specimen is bonded to a steel test plate cleaned with acetone, so that the steel plate protrudes beyond the adhesive tape to the right and left, and so that the adhesive tape protrudes beyond the test plate by 2 mm at the top edge. The bond area of the sample in terms of height·width=13 mm·10 mm. The bond site is subsequently rolled down six times with a 2 kg steel roller at a speed of 10 m/min. The adhesive tape is reinforced flush with a stable adhesive strip which serves as a support for the travel sensor. The sample is suspended vertically by means of the test plate.

Microshear Test:

The sample specimen under measurement is loaded at the bottom end with a 100 g weight. The test temperature is 40° C., the test time 30 minutes (15 minutes of loading and 15 minutes of unloading). The shear travel after the specified test duration at constant temperature is reported as the result, in μm, as both the maximum value ["max"; maximum shear travel as a result of 15-minute loading] and the minimum value ["min"; shear travel ("residual deflection") 15 minutes after unloading; on unloading there is a backward movement as a result of relaxation]. Likewise reported is the elastic component in percent ["elast"; elastic component=(max−min)·100/max].

VIII. Dynamic Shear Strength:

A square of adhesive transfer tape with an edge length of 25 mm is bonded between two steel plates and the bond is pressed down at 0.9 kN (force P) for 1 minute. Following storage for 24 hours, the assembly is parted in a tensile testing machine from Zwick, at 50 mm/min and at 23° C. and 50% relative humidity, in such a way that the two steel plates are pulled apart at an angle of 180°. The maximum force is ascertained, in $N/cm^2$.

TABLE 1

| Raw materials used: | | | |
|---|---|---|---|
| Chemical compound | Trade name | Manufacturer | CAS No. |
| Bis(4-tert-butylcyclohexyl) peroxydicarbonate | Perkadox ® 16 | Akzo Nobel | 15520-11-3 |
| 2,2'-Azobis(2-methylbutyronitrile) | Vazo ® 67 | DuPont | 13472-08-7 |
| Benzotriazol-1-yl-oxytripyrrolidinophosphonium hexafluorophosphate | PyBOP ® | Merck Millipore | 128625-52-5 |
| 2-Bromo-1-ethylpyridinium tetrafluoroborate | BEP ® | Sigma-Aldrich | 878-23-9 |
| Dicyclohexylcarbodiimide | DCC ® | Sigma-Aldrich | 538-75-0 |
| 2,4-Dichloro-6-methoxy-1,3,5-triazine | DCMT ® | Sigma-Aldrich | 3638-04-8 |
| 5-Amino-1,3,3-trimethylcyclohexanemethylamine | Isophoronediamine (IPDA) | Sigma Aldrich | 2855-13-2 |
| Ethylene glycol | EG | Sigma-Aldrich | 40771-26-4 |
| Pentaerythritol polyglycidyl ether | Polypox R16 | DOW Chemical | 30973-88-7 |
| Acrylic acid n-butyl ester | n-Butyl acrylate | Rohm & Haas | 141-32-2 |
| Acrylic acid | Acrylic acid, pure | BASF | 79-10-7 |
| 2-Ethylhexyl acrylate | | Brenntag | 103-11-7 |

Preparation of Base Polymer Ac1

A reactor conventional for radical polymerizations was charged with 30.0 kg of 2-ethylhexyl acrylate, 67.0 kg of butyl acrylate, 3.0 kg of acrylic acid and 66.7 kg of acetone/isopropanol (96:4). After nitrogen gas had been passed through the reactor for 45 minutes with stirring, the reactor was heated up to 58° C. and 50 g of Vazo 67 in solution in 500 g of acetone were added. The external heating bath was subsequently heated to 70° C. and the reaction was carried out constantly at this external temperature. After 1 hour a further 50 g of Vazo 67 in solution in 500 g of acetone were added, and after 2 hours the batch was diluted with 10 kg of acetone/isopropanol mixture (96:4). After 5.5 hours, 150 g of bis-(4-tert-butylcyclohexyl)eroxydicarbonate in solution in 500 g of acetone were added; after 6 hours 30 minutes, the batch was again diluted with 10 kg of acetone/isopropanol mixture (96:4). After 7 hours, a further 150 g of bis-(4-tert-butylcyclohexyl)peroxydicarbonate in solution in 500 g of acetone were added, and the heating bath was set to a temperature of 60° C.

After a reaction time of 22 hours, the polymerization was discontinued and the batch was cooled to room temperature. The product had a solids content of 50.2%. The resulting polyacrylate had a K value of 75.2, a weight-average molecular weight Mw of 1370000 g/mol, a polydispersity D (Mw/Mn) of 17.13 and a static glass transition temperature Tg of −38.0° C.

Preparation of Base Polymer Ac2

A reactor conventional for radical polymerizations was charged with 47.0 kg of 2-ethylhexyl acrylate, 47.0 kg of butyl acrylate, 9.0 kg of acrylic acid and 72.4 kg of acetone/benzine (50:50). After nitrogen gas had been passed through the reactor for 45 minutes with stirring, the reactor was heated up to 58° C. and 50 g of Vazo 67 in solution in 500 g of acetone were added. The external heating bath was subsequently heated to 70° C. and the reaction was carried out constantly at this external temperature. After 1 hour a further 50 g of Vazo 67 in solution in 500 g of acetone were added, and after 2 hours the batch was diluted with 10 kg of acetone/isopropanol mixture (96:4). After 5.5 hours, 150 g of bis-(4-tert-butylcyclohexyl)peroxydicarbonate in solution in 500 g of acetone were added; after 6 hours 15 minutes, the batch was again diluted with 10 kg of acetone/benzine mixture (50:50). After 7 hours, a further 150 g of bis-(4-tert-butylcyclohexyl)peroxydicarbonate in solution in 500 g of acetone were added, and the heating bath was set to a temperature of 60° C.

After a reaction time of 22 hours, the polymerization was discontinued and the batch was cooled to room temperature. The product had a solids content of 39.7%. The resulting polyacrylate had a K value of 64.2, a weight-average molecular weight Mw of 946000 g/mol, a polydispersity D (Mw/Mn) of 68.69 and a static glass transition temperature Tg of −47.0° C.

Preparation of Base Polymer Ac3

A reactor conventional for radical polymerizations was charged with 45.5 kg of 2-ethylhexyl acrylate, 45.5 kg of butyl acrylate, 9.0 kg of acrylic acid and 72.4 kg of acetone/benzine (50:50). After nitrogen gas had been passed through the reactor for 45 minutes with stirring, the reactor was heated up to 58° C. and 50 g of Vazo 67 in solution in 500 g of acetone were added. The external heating bath was subsequently heated to 70° C. and the reaction was carried out constantly at this external temperature. After 1 hour a further 50 g of Vazo 67 in solution in 500 g of acetone were added, and after 2 hours the batch was diluted with 10 kg of acetone/isopropanol mixture (96:4). After 5.5 hours, 150 g of bis-(4-tert-butylcyclohexyl)peroxydicarbonate in solution in 500 g of acetone were added; after 6 hours, the batch was again diluted with 10 kg of acetone/benzine mixture (50:50). After 7 hours, a further 150 g of bis-(4-tert-butylcyclohexyl) peroxydicarbonate in solution in 500 g of acetone were added, and the heating bath was set to a temperature of 60° C.

After a reaction time of 22 hours, the polymerization was discontinued and the batch was cooled to room temperature. The product had a solids content of 41.3%. The resulting polyacrylate had a K value of 55.0, a weight-average molecular weight Mw of 904000 g/mol, a polydispersity D (Mw/Mn) of 44.89 and a static glass transition temperature Tg of −39° C.

The base polymers Ac1, Ac2 and Ac3, present in solution, were each diluted to a solids content of 35% with acetone, then blended with a 10% strength solution of the activator and/or crosslinker in acetone, and subsequently coated from solution onto a siliconized release film (50 μm polyester) as a transfer specimen with a coating speed of 2.5 m/min. The coat weight in each case here was 50 g/m². The specimens were dried in a drying cabinet at 80° C. for 15 minutes. Specimens KB 4 to KB 13 consisted of a plurality of layers, which after coating were in each case evaporated off likewise in a drying cabinet (80° C., 15 minutes) and, after cooling to room temperature, were laminated together, to give a coat weight of 100 g/m² in total in the case of two-layer specimens and 150 g/m² in the case of three-layer specimens.

No measurements could be carried out with KB 14, because the specimen exhibited gelling in the glass even after blending and could no longer be coated onto the release film.

Production of Adhesive Tapes KB 1 to KB 13

TABLE 2

Adhesive-specific details

| | | | Layer 1 | | | | Layer 2 | |
|---|---|---|---|---|---|---|---|---|
| Name | Number of layers | 1$^{st}$ Base polymer | Activator | Activator fraction [$n_{activator}/n_{COOH}$; in mol %] | Crosslinker | Crosslinker fraction [$n_{crosslinker}/n_{COOH}$ in mol %] | 2$^{nd}$ Base polymer | Crosslinker/ activator | Crosslinker/activator fraction [$n_{crosslinker}/n_{COOH}$; in mol %] |
| KB 1* | One | Ac1 | — | — | Polypox R16 | 3.6 | — | — | — |
| KB 2* | One | Ac1 | IPDA | 28.21 | Polypox R16 | 3.6 | — | — | — |
| KB 3* | One | Ac1 | PyBOP | 1.29 | Polypox R16 | 3.6 | — | — | — |
| KB 4* | Two | Ac1 | — | — | Polypox R16 | 3.6 | Ac1 | IPDA | 28.21 |
| KB 5* | Two | Ac1 | PyBOP | 2.77 | — | — | Ac1 | IPDA | 4.23 |
| KB 6* | Two | Ac1 | PyBOP | 2.77 | — | — | Ac1 | EG | 4.39 |
| KB 7 | Two | Ac1 | PyBOP | 2.77 | Polypox R16 | 3.6 | Ac1 | IPDA | 4.23 |
| KB 8 | Two | Ac1 | DCC | 7 | Polypox R16 | 3.6 | Ac1 | IPDA | 4.23 |
| KB 9 | Two | Ac1 | DCMT | 8 | Polypox R16 | 3.6 | Ac1 | IPDA | 4.23 |
| KB 10 | Two | Ac1 | BEP | 5.3 | Polypox R16 | 3.6 | Ac1 | IPDA | 4.23 |
| KB 11** | Three | Ac1 | PyBOP | 2.77 | Polypox R16 | 3.6 | Ac1 | IPDA | 4.23 |
| KB 12** | Three | Ac2 | PyBOP | 1.38 | Polypox R16 | 1.8 | Ac2 | IPDA | 2.12 |
| KB 13** | Three | Ac3 | PyBOP | 0.92 | Polypox R16 | 1.2 | Ac3 | IPDA | 1.41 |
| KB 14* | One | Ac1 | PyBOP | 2.77 | IPDA | 4.23 | — | — | — |

*Specimens KB 1-KB 6 and KB 14 serve as comparative examples.
**Specimens KB 11, KB 12 and KB 13 consist of a three-layer assembly, with the two outer layers corresponding to the 1$^{st}$ base polymer and the middle layer to the base polymer 2.

TABLE 3

Determination of crosslinking state from the elastic component after different storage times at room temperature

| | Layer construction | Elastic component [%] 0dRT | Elastic component [%] 7dRT | Elastic component [%] 14dRT |
|---|---|---|---|---|
| KB 1* | one-layer | 0 | 0 | 4 |
| KB 2* | one-layer | 0 | 14 | 30 |
| KB 3* | one-layer | 0 | 0 | 5 |
| KB 4* | two-layer | 0 | 0 | 21 |
| KB 5* | two-layer | 15 | 30 | 45 |
| KB 6* | two-layer | 9 | 25 | 42 |
| KB 7 | two-layer | 30 | 49 | 63 |
| KB 8 | two-layer | 28 | 39 | 55 |
| KB 9 | two-layer | 24 | 36 | 54 |
| KB 10 | two-layer | 25 | 33 | 57 |
| KB 11** | three-layer | 36 | 52 | 67 |
| KB 12** | three-layer | 38 | 57 | 70 |
| KB 13** | three-layer | 37 | 59 | 71 |

*KB 1-KB 6 serve as comparative examples.
**KB 11 to KB 13 are constructed as a 3-layer assembly, with the two outer layers consisting of the same base polymer.

In all of the investigations for properties after different storage times at room temperature, the completed product consisting of a plurality of layers laminated together was the product stored in each case for multilayer constructions. "0dRT" means that the products were stored for half a day at room temperature in order to enable initial crosslinking particularly in the case of the multilayer products.

The elastic component measurements were made according to "Microshear test", test method VII, and they serve as a measure for determining the crosslinking state. The greater the elastic component, the further advanced the crosslinking.

It is evident on the basis of table 3 that significantly accelerated crosslinking is exhibited even by the two-layer systems of the invention. Through the three-layer construction, this can be accelerated again.

Further to the room temperature storage, the specimens and/or their individual layers were stored at 60° C. for a total of 4 weeks. Subsequently—and in this case, therefore, only after storage had taken place—the multilayer specimens,

TABLE 4

Results of the peel adhesion measurements on different substrates after storage at room temperature

| Method | Peel adhesion, steel at 300 mm/min [N/cm] | | | Peel adhesion, PE at 300 mm/min [N/cm] | | |
|---|---|---|---|---|---|---|
| Storage | 0 d RT | 7 dR T | 14 d RT | 0 d RT | 7 d RT | 14 d RT |
| KB 1* | 12.8 (C) | 12.5 (C) | 10.3 (M) | 5.4 (A) | 5 (A) | 4.3 (A) |
| KB 2* | 12.1 (C) | 11.5 (C) | 9.9 (M) | 4.7 (A) | 4 (A) | 3.7 (A) |
| KB 3* | 12.6 (C) | 12.7 (C) | 10.8 (M) | 5.3 (A) | 4.9 (A) | 4.1 (A) |
| KB 4* | 12.3 (C) | 11.9 (C) | 11.0 (M) | 5.7 (A) | 5.2 (A) | 4.6 (A) |
| KB 5* | 10.9 (M) | 9.6 (A) | 8.7 (A) | 4.3 (A) | 3.8 (A) | 3.9 (A) |
| KB 6* | 11.4 (M) | 10.1 (A) | 9.2 (A) | 4.8 (A) | 4.2 (A) | 3.9 (A) |
| KB 7 | 10.7 (A) | 9.4 (A) | 8.3 (A) | 4.6 (A) | 4.3 (A) | 4.2 (A) |
| KB 8 | 10.6 (A) | 10 (A) | 8.1 (A) | 4.4 (A) | 4.4 (A) | 4.3 (A) |
| KB 9 | 11 (A) | 10.3 (A) | 8.5 (A) | 4.4 (A) | 4.5 (A) | 4.3 (A) |
| KB 10 | 10.8 (A) | 9.7 (A) | 8.8 (A) | 4.5 (A) | 4.6 (A) | 4.3 (A) |
| KB 11 | 9.7 (A) | 8.8 (A) | 7.6 (A) | 4.3 (A) | 4.1 (A) | 4.1 (A) |
| KB 12 | 8.9 (A) | 8.2 (A) | 7.7 (A) | 3.3 (A) | 3.9 (A) | 3.4 (A) |
| KB 13 | 8.5 (A) | 8.1 (A) | 7.4 (A) | 5.9 (A) | 5.8 (A) | 5.5 (A) |

*Comparative experiments

The measurement of the peel adhesion as well, carried out according to test method VI at a 180° angle and 300 mm/min on a steel or PE substrate, respectively, shows after-crosslinking of the samples. The specimens display a change in the fracture behavior from C (cohesive fracture) via M (mixed fracture) through to A (adhesive fracture). Moreover, a drop in the peel strength after prolonged storage can be recorded. This likewise suggests after-crosslinking.

TABLE 5

Values of the measurement of holding power and shear strength after storage at room temperature

| Method | Holding power [min] | | | Dynamic shear test [N/cm$^2$] | | |
|---|---|---|---|---|---|---|
| Storage | 0 d RT | 7 d RT | 14 d RT | 0 d RT | 7 d RT | 14 d RT |
| KB 1* | 25 (C) | 102 (C) | 657 (M) | 9.3 (C) | 13.7 (C) | 25.2 (C) |
| KB 2* | 36 (C) | 89 (C) | 469 (M) | 10.5 (C) | 18.3 (C) | 29.7 (C) |
| KB 3* | 13 (C) | 98 (C) | 597 (M) | 9.9 (C) | 19.4 (C) | 20.4 (C) |
| KB 4* | 37 (C) | 68 (C) | 479 (M) | 10.7 (C) | 19.3 (C) | 27.5 (C) |
| KB 5* | 45 (C) | 207 (C) | 903 (M) | 22.1 (C) | 30.5 (C) | 40.8 (C) |
| KB 6* | 39 (C) | 198 (C) | 798 (M) | 23.3 (C) | 31.2 (C) | 38.3 (C) |
| KB 7 | 214 (C) | 638 (M) | 4113 (A) | 25.7 (C) | 42.8 (C) | 50.2 (M) |
| KB 8 | 369 (C) | 701 (M) | 3997 (A) | 20.8 (C) | 39.1 (C) | 49.8 (M) |
| KB 9 | 414 (C) | 540 (M) | 4141 (A) | 21.2 (C) | 35.6 (C) | 51.3 (M) |
| KB 10 | 317 (C) | 497 (M) | 3774 (A) | 19.6 (C) | 28.9 (C) | 47.5 (M) |
| KB 11 | 588 (M) | 1948 (A) | 6929 (A) | 27.4 (C) | 45.0 (M) | 60.7 (A) |
| KB 12 | 573 (M) | 2505 (A) | 6320 (A) | 30 (C) | 49.2 (M) | 63.9 (A) |
| KB 13 | 614 (M) | 1101 (A) | 7493 (A) | 32.5 (C) | 55.7 (M) | 72.1 (A) |

*Comparative experiments

This is also made clear by the holding powers from the measurement according to test method V and from the values from the dynamic shear test according to test method VII. Apparent there over time likewise is a change in the fracture behavior of the specimens, and the shear strength increases with time as well. In the dynamic shear test, similar behavior is evident.

Adhesive performance testing shows that the use of a multicomponent system with utilization of differently blended PSAs and with use of an activator affords significant advantages in relation to crosslinking time at room temperature.

after cooling to room temperature, were laminated together and stored for half a day at room temperature; subsequently the microshear test was carried out on all of the samples. Here it was found that the samples KB 1, KB 2, KB 3 and KB 4 had significantly higher elastic components than in the case of the measurement after 0 days at room temperature. Conversely, the specimens KB 5 to KB 13 laminated together after 60° C. storage, but especially the specimens KB7 to KB 13, showed values comparable to or insignificantly greater than those in the case of measurement straight after coating and drying. Accordingly, the specimens of the invention exhibit storage stability even at relatively high temperatures.

TABLE 6

Determination of crosslinking state from the elastic component after different storage times at room temperature and 60° C.

| Construction at measurement | Elastic component [%] 0dRT | Elastic component [%] 14dRT | Elastic component [%] 4 weeks storage 60° C. |
|---|---|---|---|
| KB 1* | one-layer | 0 | 4 | 60 |
| KB 2* | one-layer | 0 | 30 | 85 |
| KB 3* | one-layer | 0 | 5 | 7 |
| KB 4* | two-layer | 0 | 21 | 45 |
| KB 5* | two-layer | 15 | 45 | 42 |
| KB 6* | two-layer | 9 | 42 | 46 |
| KB 7 | two-layer | 30 | 63 | 63 |
| KB 8 | two-layer | 28 | 55 | 60 |
| KB 9 | two-layer | 24 | 54 | 59 |
| KB 10 | two-layer | 25 | 57 | 57 |
| KB 11** | three-layer | 36 | 67 | 73 |
| KB 12** | three-layer | 38 | 70 | 71 |
| KB 13** | three-layer | 37 | 71 | 73 |

*KB 1-KB 6 serve as comparative examples.
**KB 11 to KB 13 are constructed as a 3-layer assembly, with the two outer layers consisting of the same base polymer.

The invention claimed is:
1. A kit comprising at least two pressure-sensitive adhesive layers A and B, where
the two pressure-sensitive adhesive layers A and B independently of one another each comprise at least one polymer containing two or more carboxyl groups;

in the pressure-sensitive adhesive layer A, some of the carboxyl groups of the polymer containing them are activated as a result of reaction with an activator $A_A$;
and,
the pressure-sensitive adhesive layer A comprises:
at least one crosslinker $V_A$ which is suitable for a crosslinking reaction with the carboxyl groups of the polymers comprising them in the pressure-sensitive adhesive layers A and B, but is not substantially reactive in the pressure-sensitive adhesive layer A when said layer A is not in contact with layer B;
the pressure-sensitive adhesive layer B comprises:
at least crosslinker $V_B$ which is suitable
for accelerating the crosslinking reaction of the carboxyl groups of the polymer containing them in the pressure-sensitive adhesive layer B with the crosslinker $V_A$, and
enabling and accelerating the crosslinking reaction of the carboxyl groups of the polymer comprising them in the pressure-sensitive adhesive layer A with the crosslinker $V_A$, and
for the crosslinking reaction with the activated carboxyl groups of the polymer comprising them in the pressure-sensitive adhesive layer A.

2. The kit according to claim 1, wherein the polymer comprising two or more carboxyl groups in the pressure-sensitive adhesive layer A is poly(meth)acrylate.

3. The kit according to claim 1, wherein the polymer comprising two or more carboxyl groups in the pressure-sensitive adhesive layer B is a poly(meth)acrylate.

4. The kit according to claim 1 wherein the activator $A_A$ is selected from the group consisting of: carbodiimides, benzotriazolyl-N-oxyphosphonium compounds, azabenzotriazolyl-N-oxyphosponium compounds, O-(benzotriazole-1-yl)uranium compounds, O-(7-azabenzotriasol-1-ykl)uranium compounds, N-uronium-substituted cyclic imides, thiophosphinic chlorides, thiophosphinic azides, triazyl esters and α-halopyridinum salts.

5. The kit according to claim 1 wherein the crosslinker $V_A$ is a polyfunctional epoxide.

6. The kit according to claim 1 wherein the crosslinker $V_B$ is selected from the group consisting of: polyester polyols, polyfunctional amines and polyfunctional alcohols.

7. An adhesive tape formed by:
contacting at least two pressure-sensitive adhesive layers A and B where the two pressure-sensitive adhesive layers A and B independently of one another each comprise at least one polymer containing at least one polymer containing two or more carboxyl groups;
in the pressure-sensitive adhesive layer A, some of the carboxyl groups of the polymer comprising them are activated as a result of reaction with an activator $A_A$;
and,
the pressure-sensitive adhesive layer A comprises:
at least one crosslinker $V_A$ which is suitable for a crosslinking reaction with the carboxyl groups of the polymers comprising them in the pressure-sensitive adhesive layers A and B, but is not substantially reactive in the pressure-sensitive adhesive layer A when said layer A is not in contact with layer B;
the pressure-sensitive adhesive layer B comprises:
at least crosslinker $V_B$ which is suitable
for accelerating the crosslinking reaction of the carboxyl groups of the polymer containing them in the pressure-sensitive adhesive layer B with the crosslinker $V_A$, and
for enabling and accelerating the crosslinking reaction of the carboxyl groups of the polymer comprising them in the pressure-sensitive adhesive layer A with the crosslinker $V_A$, and
for the crosslinking reaction with the activated carboxyl groups of the polymer comprising them in the pressure-sensitive adhesive layer A.

8. The adhesive tape according to claim 7, in that it is formed by the contacting of two or more pressure-sensitive adhesive layers A and/or B.

9. The adhesive tape according to claim 8, wherein that it has a structure of the form A-B-A or has an alternating structure A-B-A-B-A-B-A . . . and the outermost layers in each structure are formed of a pressure-sensitive adhesive layer A.

10. A method of producing an adhesive tape, comprising:
contacting at least two pressure-sensitive adhesive layers A and B where the said two pressure-sensitive adhesive layers A and B independently of one other each comprise at least one polymer containing at least one polymer containing two or more carboxyl groups;
in the pressure-sensitive adhesive layer A, some of the carboxyl groups of the polymer comprising them are activated as a result of reaction with an activator $A_A$;
and,
the pressure-sensitive adhesive layer A comprises:
at least one crosslinker $V_A$ which is suitable for a crosslinking reaction with the carboxyl groups of the polymers comprising them in the pressure-sensitive adhesive layers A and B, but is not substantially reactive in the pressure-sensitive adhesive layer A when said layer A is not in contact with layer B;
the pressure-sensitive adhesive layer B comprises:
at least crosslinker $V_B$ which is suitable
for accelerating the crosslinking reaction of the carboxyl groups of the polymer containing them in the pressure-sensitive adhesive layer B with the crosslinker $V_A$, and
for enabling and accelerating the crosslinking reaction of the carboxyl groups of the polymer comprising them in the pressure-sensitive adhesive layer A with the crosslinker $V_A$, and
for the crosslinking reaction with the activated carboxyl groups of the polymer comprising them in the pressure-sensitive adhesive layer A.

* * * * *